United States Patent
Kelly et al.

(10) Patent No.: US 10,652,414 B2
(45) Date of Patent: May 12, 2020

(54) SCANNER APPARATUS HAVING AN OPTICAL SENSOR

(71) Applicant: Hewlett-Packard Development Company, L.P., Spring, TX (US)

(72) Inventors: Gareth Ryan Kelly, San Diego, CA (US); Curtis J Behrend, San Diego, CA (US); Matthew Douglas Reier, Vancouver, WA (US); Arthur H Barnes, Vancouver, WA (US); Kevin Lo, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/332,092

(22) PCT Filed: Sep. 12, 2016

(86) PCT No.: PCT/US2016/051330
§ 371 (c)(1),
(2) Date: Mar. 11, 2019

(87) PCT Pub. No.: WO2018/048445
PCT Pub. Date: Mar. 15, 2018

(65) Prior Publication Data
US 2019/0364165 A1 Nov. 28, 2019

(51) Int. Cl.
*H04N 1/00* (2006.01)
(52) U.S. Cl.
CPC ..... *H04N 1/00689* (2013.01); *H04N 1/00734* (2013.01); *H04N 1/00819* (2013.01)

(58) Field of Classification Search
None
See application file for complete search history.

(56) References Cited

U.S. PATENT DOCUMENTS

| | | | | |
|---|---|---|---|---|
| 5,016,049 A | | 5/1991 | Onishi et al. | |
| 5,134,429 A | * | 7/1992 | Ishikawa | G03B 27/32 396/33 |
| 5,710,637 A | * | 1/1998 | Matsumoto | H04N 1/00127 235/379 |
| 5,778,276 A | * | 7/1998 | Hasegawa | G03G 15/5025 355/75 |
| 5,929,435 A | * | 7/1999 | Han | H04N 1/00803 250/234 |

(Continued)

OTHER PUBLICATIONS

Auto Paper Size detect no longer works when scanning from OJ 7612, 2016, 3 pages http://h030434.www3.hp.com/.

(Continued)

*Primary Examiner* — Anh-Vinh T Nguyen
(74) *Attorney, Agent, or Firm* — Mannava & Kang (57) ABSTRACT

According to an example, a scanner apparatus may include a housing, a scan panel positioned on the housing and a lid rotatably mounted to the housing. The lid may be moved between a closed position and an open position, in which in the closed position, the lid covers the scan panel and in the open position, the lid is extended away from the scan panel. The scanner apparatus may also include an optical sensor to detect media placed on the scan panel and a media engine to determine whether the optical sensor has detected a media on the scan panel while the lid is in the open position.

14 Claims, 6 Drawing Sheets

(56) References Cited

U.S. PATENT DOCUMENTS

| | | | | |
|---|---|---|---|---|
| 6,646,768 | B1* | 11/2003 | Andersen | G03G 15/607 358/474 |
| 6,791,724 | B2* | 9/2004 | Khovaylo | H04N 1/00551 358/474 |
| 7,221,487 | B2* | 5/2007 | Sesek | H01L 27/146 257/E27.13 |
| 8,553,835 | B2* | 10/2013 | Hangartner | A61B 6/032 378/157 |
| 8,587,843 | B2* | 11/2013 | Enami | H04N 1/00681 358/474 |
| 8,760,739 | B2 | 6/2014 | Golding et al. | |
| 8,908,236 | B1 | 12/2014 | Rudge et al. | |
| 9,420,136 | B1* | 8/2016 | Misaka | H04N 1/00708 |
| 9,571,684 | B1* | 2/2017 | Phelps | H04N 1/00713 |
| 9,756,204 | B2* | 9/2017 | Baba | H04N 1/00801 |
| 2001/0000979 | A1* | 5/2001 | Han | H04N 1/00347 358/474 |
| 2004/0100669 | A1 | 5/2004 | Tecu et al. | |
| 2006/0028696 | A1* | 2/2006 | Michiie | G03G 15/607 358/474 |
| 2006/0193013 | A1* | 8/2006 | Hoshi | H04N 1/00708 358/474 |
| 2007/0139727 | A1 | 6/2007 | Booppanon et al. | |
| 2008/0231892 | A1* | 9/2008 | Sugahara | H04N 1/00355 358/1.15 |
| 2009/0067012 | A1* | 3/2009 | Iwayama | H04N 1/00681 358/475 |
| 2009/0219558 | A1* | 9/2009 | Murakami | H04N 1/387 358/1.13 |
| 2010/0061781 | A1* | 3/2010 | Won | B65H 5/062 399/367 |
| 2010/0073740 | A1* | 3/2010 | Kojima | H04N 1/00222 358/474 |
| 2010/0085611 | A1* | 4/2010 | Quan | H04N 1/00681 358/474 |
| 2010/0118327 | A1* | 5/2010 | Caspar | H04N 1/00238 358/1.13 |
| 2012/0243054 | A1* | 9/2012 | Sellers | H04N 1/00814 358/448 |
| 2013/0083376 | A1* | 4/2013 | Miura | H04N 1/00612 358/498 |
| 2013/0157282 | A1* | 6/2013 | Bouzid | G01N 21/76 435/7.1 |
| 2013/0201502 | A1 | 8/2013 | Rajendraprasad | |
| 2015/0029563 | A1* | 1/2015 | Tao | H04N 1/00771 358/498 |
| 2015/0062664 | A1* | 3/2015 | Hanamura | H04N 1/00708 358/449 |
| 2016/0021270 | A1* | 1/2016 | Misaka | H04N 1/00708 358/461 |
| 2016/0150109 | A1* | 5/2016 | Matsui | H04N 1/00708 358/1.13 |
| 2016/0205280 | A1* | 7/2016 | Kato | H04N 1/00551 |
| 2016/0255212 | A1* | 9/2016 | Kato | H04N 1/00082 358/488 |
| 2016/0323466 | A1* | 11/2016 | Sato | H04N 1/00713 |
| 2017/0094093 | A1* | 3/2017 | Mori | H04N 1/0464 |
| 2017/0163838 | A1* | 6/2017 | Obata | H04N 1/00748 |
| 2017/0208198 | A1* | 7/2017 | Sunako | H04N 1/00689 |
| 2018/0218859 | A1* | 8/2018 | Ligtenberg | H01H 13/85 |

OTHER PUBLICATIONS

FUJITSU: fi-6130/fi-6230 Image Scanner Operator's Guide, 2007—211 pages http://www.fujitsu.com/downloads/.

HP OfficeJet Pro X476 and X576 MFP Series, Dec. 2013, http://www.partsnow.com/docs—196 pages.

* cited by examiner

SCANNER APPARATUS HAVING AN OPTICAL SENSOR

BACKGROUND

Flatbed scanners are typically implemented to scan documents to capture and store data corresponding to images contained on the documents. The data may be stored for later retrieval, used to print a copy of the images onto other documents, or communicated over a network. Some flatbed scanners determine the sizes of the documents either before or during scanning of the images through use of a charge coupled device (CCD) or a separate sensor positioned on a carriage after a lid has been moved to a closed position. In addition, flatbed scanners often use a CCD or other device, such as a contact image sensor or a full width array to capture the images. A typical CCD sensor includes, for example, an array of light detectors that measure the differences in the intensity of the reflected light gathered from a document being scanned.

BRIEF DESCRIPTION OF THE DRAWINGS

Features of the present disclosure are illustrated by way of example and not limited in the following figure(s), in which like numerals indicate like elements, in which.

DETAILED DESCRIPTION

Disclosed herein are scanner apparatuses that may include a relatively simple and inexpensive optical sensor as well as methods for implementing the scanner apparatuses. The optical sensor may include a light source that may output a single point of light and a detector to detect an intensity of light entering into the optical sensor. The optical sensor may be implemented to determine whether a media of at least a predetermined length has been placed on a scan panel. For instance, the optical sensor may be positioned at a fixed location with respect to an origin location of the scan panel such that a determination may be made that a media is at least as long as the distance between the origin location and the optical sensor in response to a determination that the optical sensor has detected a media. A second optical sensor may also be positioned at a shorter fixed location with respect to the origin location to detect media placed on the scan panel having shorter lengths.

According to examples, the scanner apparatuses disclosed herein may detect a media size after the media is placed on the scan panel but before a scan or print job is initiated. Particularly, for instance, the scanner apparatuses disclosed herein may detect a media size before a scanner lid is moved to a closed position onto the scan panel. In other words, the scanner apparatuses disclosed herein may detect a media size while the scanner lid is still in an open position. As disclosed herein, the media size may be determined prior to the lid being closed through implementation of various calibration and processing operations.

In one regard, by determining the media size prior to a scan or print job being initiated, the amount of time required to print a first copy may be relatively shorter than waiting until after the scan or print job has been initiated. That is, for instance, the correct sized media on which the copy is to be made may be identified from the determined media size and may be pre-picked such that printing on the media may occur sooner. Although it may be possible to speed up the time required to print the first copy by always pre-picking a default sized media, the default sized media may not be appropriate for each job and thus, the pre-picked media may need to be discarded prior to printing the first copy. In contrast, the scanner apparatuses and methods disclosed herein may enable for similar speed increases without wasting the media if the pre-picked media is not the correct size.

Figure 1:
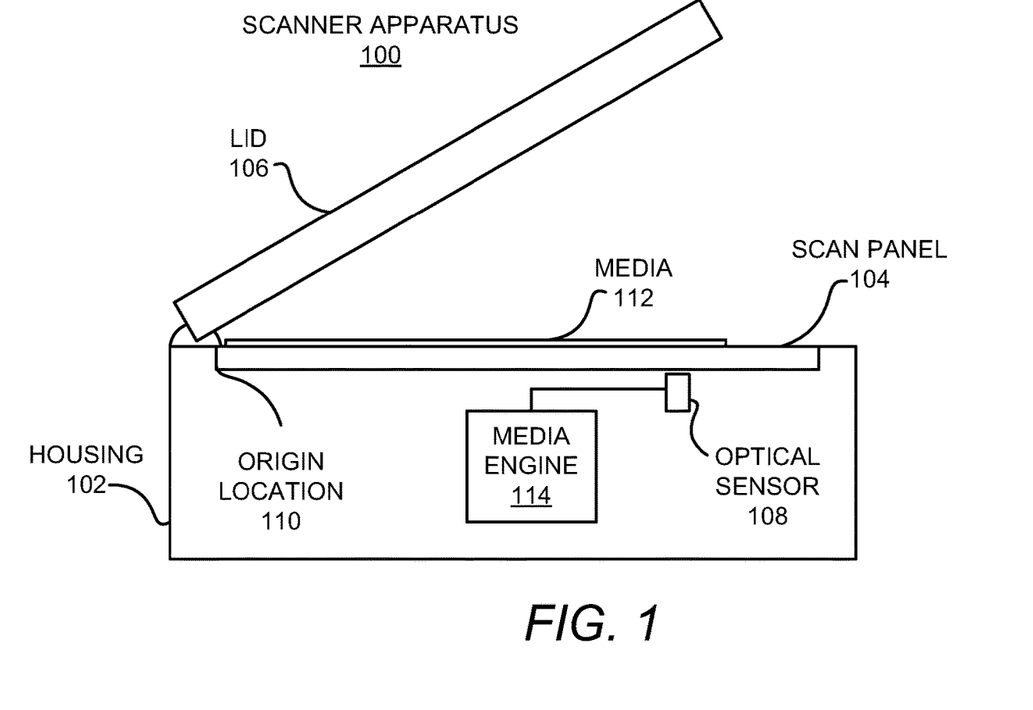
FIG. 1 depicts a block diagram of an example scanner apparatus.

With reference first to FIG. 1, there is shown a block diagram of an example scanner apparatus 100. Generally speaking, the scanner apparatus 100 may be a standalone scanning device, a scanning device of a multi-function device, or the like. It should be understood that the scanner apparatus 100 depicted in FIG. 1 may include additional components and that some of the components described herein may be removed and/or modified without departing from a scope of the scanner apparatus 100 disclosed herein. As used herein, the terms "a" and "an" are intended to denote at least one of a particular element, the term "includes" means includes but not limited to, the term "including" means including but not limited to, and the term "based on" means based at least in part on.

Although not shown, the scanner apparatus 100 may include scanning components that may represent any mechanical, electrical, or electromechanical part of the scanner apparatus 100. For instance, the scanner apparatus 100 may include a carriage with an image sensor, e.g., a charge coupled device, that is to capture images on media as the carriage is scanned across the media. The scanner apparatus 100 may also include processing instructions that are to convert the captured images into data that may be stored and/or used to reproduce images that are on the media.

The scanner apparatus 100 may have a housing 102 on which a scan panel 104 may be positioned. For instance, the scan panel 104, which may be formed of glass or other suitable transparent material, may be positioned to form an upper section of the housing 102. The scanner apparatus 100 may also include a lid 106 that is rotatably mounted to the housing 102. The lid 106 is depicted as being in an open position in which the lid 106 is extended away from the scan panel 104. The lid 106 may also be moved to a closed position in which the lid 106 covers the scan panel 104, for instance, to block ambient light from entering into the housing 102 through the scan panel 104.

The scanner apparatus 100 may also include an optical sensor 108 that is fixedly positioned at a predetermined distance from an origin location 110 and beneath the scan panel 104. The origin location 110 may be a location on the scan panel 104 at which a user is to place an edge of a media 112 to be scanned or other suitable location. The predetermined distance may correspond to a first document size, e.g., A4, A3, 8.5×11.5 inches, etc. The optical sensor 108 may thus be fixedly positioned to detect when media 112 having a document size that is at least the first document size. Particularly, the optical sensor 108 may detect an intensity of light passing through the scan panel 104 and may communicate a signal corresponding to the detected intensity of the light to a media engine 114. From the received signal, the media engine 114 may determine whether a media 112 having at least the first document size is placed on the scan panel 104.

The media engine 114 may represent any circuitry or combination of circuitry and executable instructions to control the optical sensor 108 and to determine whether a media 112 has been detected. For instance, the media engine 114 may be circuitry and/or executable instructions stored on a control board (e.g., main printed circuit assembly (MPCA)) of the scanner apparatus 100. As discussed in greater detail herein, the media engine 114 may determine whether the optical sensor 108 has detected a media 112 on the scan panel 104 while the lid 106 is in the open position. For instance, the media engine 114 may compare values of detected readings by the optical sensor 108 with baseline values determined through a calibration process to determine whether a media 112 having at least the first document length is on the scan panel 104 prior to the lid 106 being moved to the closed position. Various manners in which the baseline values may be determined and used in determining whether a media 112 having at least the first document length is on the scan panel 104 are described in greater detail herein.

According to an example, the optical sensor 108 may be a relatively simple and inexpensive optical sensor 108. For instance, the optical sensor 108 may detect a single point of light. By way of particular example, the optical sensor 108 may include a light source, e.g., a light emitting diode, that is to output a single point of light toward and through the scan panel 104 and may include a detecting mechanism, e.g., a CCD or other light sensor, to detect the single point of light reflected back from the scan panel 104 and a media 112, if present and of sufficient length.

Figure 2:
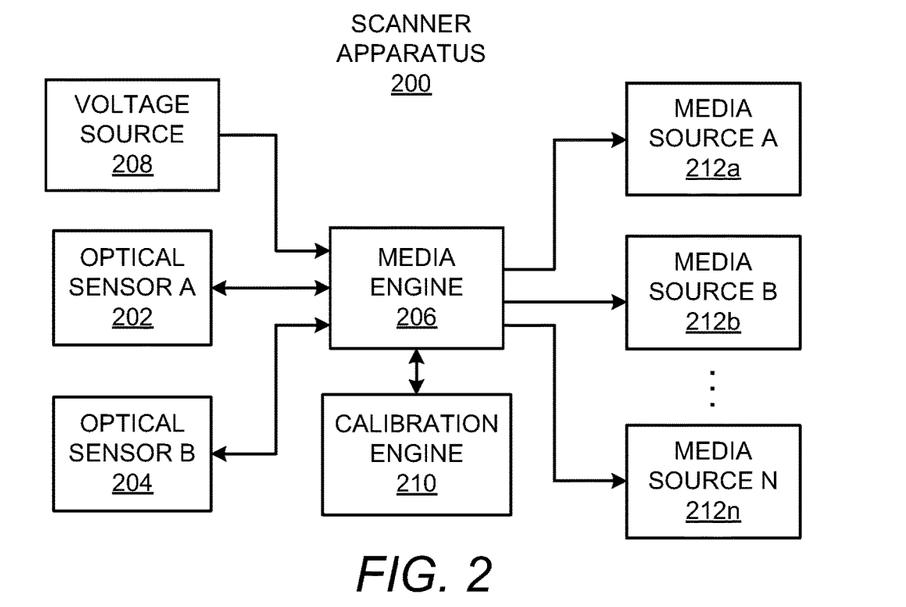
FIGS. 2 and 3, respectively, depict block diagrams of other example scanner apparatuses.

Turning now to FIG. 2, there is shown a block diagram of another example scanner apparatus 200. The scanner apparatus 200 may include a first optical sensor 202 and a second optical sensor 204. The first optical sensor 202 and the second optical sensor 204 may each be equivalent to the optical sensor 108 depicted in FIG. 1. However, the second optical sensor 204 may be positioned closer to the origin location 110 such that the second optical sensor 204 may detect media having smaller lengths than the first document length. By way of particular example, the first optical sensor 202 may be positioned to detect media 112 having at least an A3 length and the second optical sensor 204 may be positioned to detect media 112 having at least an A4 length.

The scanner apparatus 200 may also include a media engine 206 that may control operations of the optical sensors 202, 204 and may determine whether a media having at least a particular length is detected to be on the scan panel 104. The media engine 206 may be equivalent to the media engine 114 depicted in FIG. 1. In operating the optical sensors 202, 204, the media engine 206 may vary the voltage level applied to the optical sensors 202, 204. That is, for instance, the media engine 206 may control the voltage applied to the optical sensors 202, 204 from a voltage source 208. As discussed in greater detail herein, the media engine 206 may vary the voltage levels applied to either or both of the optical sensors 202, 204 to determine whether a media 112 is detected or whether ambient light has been detected.

The scanner apparatus 200 may also include a calibration engine 210 that may represent any circuitry or combination of circuitry and executable instructions to calibrate the readings of the optical sensor 108. As discussed in greater detail herein, the calibration engine 210 may perform various operations to determine baseline values that the media engine 206 may use in determining whether a media 112 is detected on the scan panel 104. The calibration engine 210 may also be circuitry and/or executable instructions stored on a control board (e.g., MPCA) of the scanner apparatus 200.

As discussed herein, a determination may be made as to whether a media 112 of at least a certain length is present on the scan panel 104 while the lid 106 is in the open position. In this regard, this determination may be made sooner than if this determination were to be made following the closing of the lid 106 onto the scan panel 104, e.g., after a scan or print operation has been initiated. According to an example, the media engine 206 may use this information to pre-pick a media from one of multiple media sources 212a-212n, in which "n" represents an integer greater than one. For instance, the media sources 212a-212n may contain media having different lengths and the media engine 206 may select a media from one of the media sources 212a-212n corresponding to the detected length of a media 112 detected to be on the scan panel 104. Because the determination of the media 112 length may be made sooner in a scanning and printing operation, the media engine 206 may select the media 112 having the correct length sooner in that operation. As a result, a multifunction device containing the scanner apparatus 200 may output a printed copy of the scanned media 112 sooner than may be possible with conventional multifunction devices that are not able to detect a media length prior to a lid being closed on a scanner.

Examples of the media may include any type of suitable sheet material, such as paper, card stock, transparencies, fabric, packaging material, and the like. Examples of marking material that may be implemented in the printing process may include ink, toner, or other type of marking material having one or multiple colors.

Figure 3:
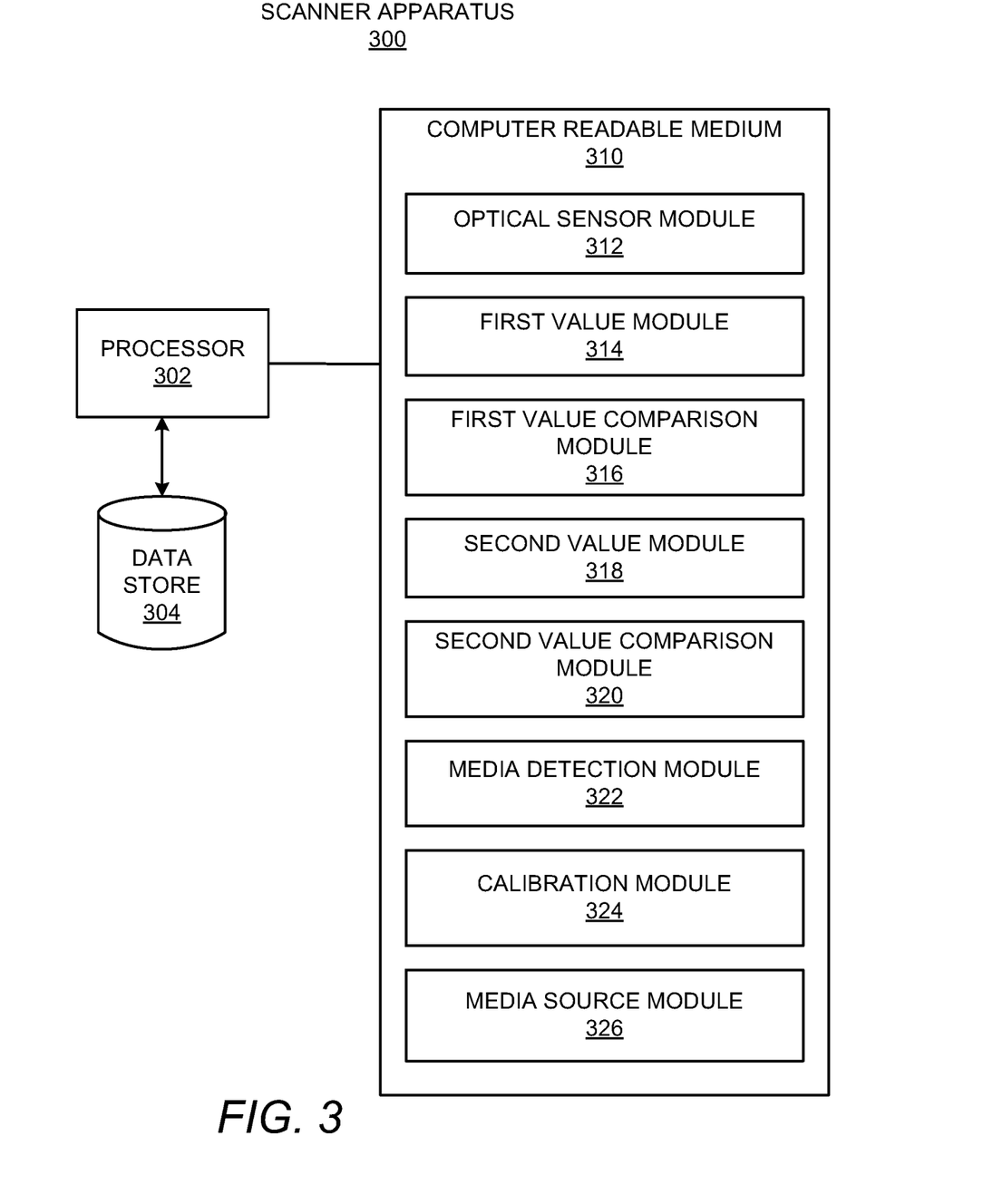

With reference now to FIG. 3, there is shown a block diagram of another example scanner apparatus 300. The scanner apparatus 300 may include a processor 302 and a computer readable medium 310, in which the computer readable medium 310 is operatively coupled to the processor 302. The computer readable medium 310 may contain a set of instructions that are executable by the processor 302. The scanner apparatus 300 may also include a data store 304 on which the processor 302 may store various information, such as print data, baseline values, etc. The set of instructions may cause the processor 302 to perform operations of the scanner apparatus 300 when the processor 302 executes the set of instructions. The set of instructions stored on the computer readable medium 310 may be represented as an optical sensor module 312, a first value module 314, a first value comparison module 316, a second value module 318, a second value comparison module 320, a media detection module 322, a calibration module 324, and a media source module 326. The modules 312-322 may represent machine readable instructions that when executed function as the media engine 206 depicted in FIG. 2. In addition, the calibration module 324 may represent machine readable instructions that when executed function as the calibration engine 210 depicted in FIG. 2.

The processor 302 may carry out a set of instructions to execute the modules 312-326 and/or any other appropriate operations among and/or associated with the modules of the scanner apparatus 300. For example, the processor 302 may carry out a set of instructions to determine whether a media of a certain length is detected.

Although modules 312-326 are illustrated and discussed in relation to FIG. 3 and other example implementations, other combinations or sub-combinations of modules may be included within other implementations. Stated differently, although the modules illustrated in FIG. 3 and discussed in other example implementations may perform specific functionalities in the examples discussed herein, these and other functionalities may be accomplished, implemented, or realized at different modules or at combinations of modules. For example, two or more modules illustrated and/or discussed as separate may be combined into a module that performs the functionalities discussed in relation to the two modules. As another example, functionalities performed at one module as discussed in relation to these examples may be performed at a different module or different modules.

The processor 302 may be any appropriate circuitry that is to process (e.g., computing) instructions, such as one or multiple processing elements that may retrieve instructions from the computer readable medium 310 and executing those instructions. For example, the processor 302 may be a central processing unit (CPU) that enables operational adjustment by fetching, decoding, and executing the modules 312-326. Example processors 302 may include at least one CPU, a semiconductor-based microprocessor, a programmable logic device (PLD), and the like. Example PLDs may include an application specific integrated circuit (ASIC), a field-programmable gate array (FPGA), a programmable array logic (PAL), a complex programmable logic device (CPLD), and an erasable programmable logic device (EPLD). The processor 302 may include multiple processing elements that are integrated in a single device or distributed across devices. The processor 302 may process the instructions serially, concurrently, or in partial concurrence.

The computer readable medium 310 may represent a medium to store data utilized and/or produced by the scanner apparatus 300. The computer readable medium 310 may be any non-transitory medium or combination of non-transitory mediums able to electronically store data, such as the modules 312-326 and/or data used by the scanner apparatus 300. For example, the computer readable medium 310 may be distinct from a transitory transmission medium, such as a signal. As used herein, a non-transitory computer readable medium may refer to any storage medium with the exclusion of a signal. The computer readable medium for 310 may be an electronic, magnetic, optical, or other physical storage device that may contain (i.e., store) executable instructions. The computer readable medium 310 may store program instructions that when executed by the processor 302 cause the processor 302 to implement functionality of the scanner apparatus 300. The computer readable medium 310 may be integrated in the same device as the processor 302 or may be separate but accessible to that device and the processor 302. The computer readable medium 310 may also be distributed across devices.

In some examples, the scanner apparatus 300 may include the executable instructions or may be part of an installation package that when installed may be executed by the processor 302 to perform operations of the scanner apparatus 300. In that example, the computer readable medium 310 may be a portable medium such as a compact disc, a digital video disc, a flash drive, or memory maintained by a computer device, such as a server, from which the installation package may be downloaded and installed. In another example, the executable instructions may be part of an application or applications already installed. The computer readable medium 310 may be a non-volatile memory resource such as read only memory (ROM), a volatile memory resource such as random access memory (RAM), a storage device, or a combination thereof. Example forms of a computer readable medium 310 may include static RAM (SRAM), dynamic RAM (DRAM), electrically erasable programmable ROM (EEPROM), flash memory, or the like. The computer readable medium 310 may include integrated memory such as a hard drive (HD), a solid state drive (SSD), an optical drive, or the like.

Figure 4:
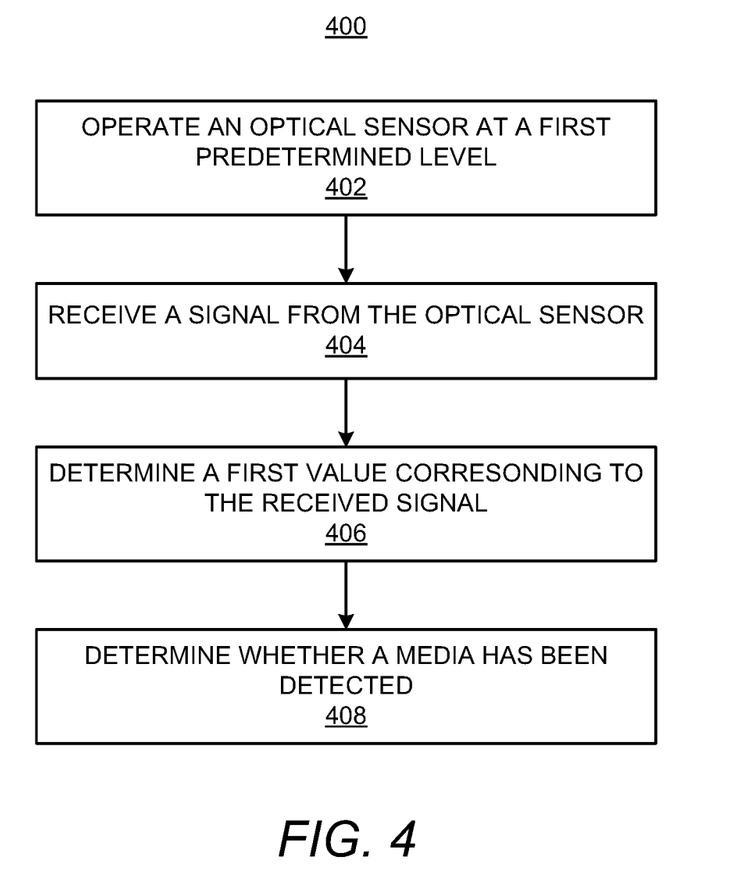
FIG. 4 depicts a flow diagram of an example method for determining whether a media of a certain length has been detected on a scan panel.
Figure 5:
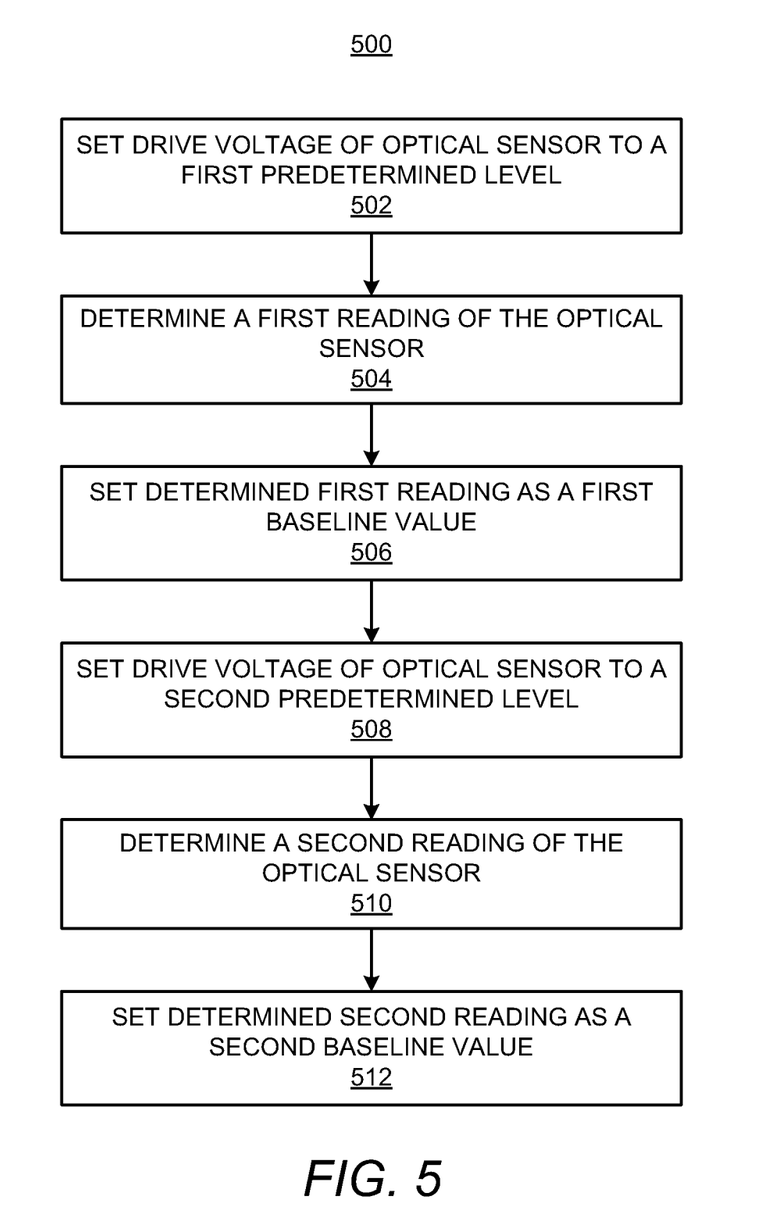
FIG. 5 depicts a flow diagram of an example method for calibrating baseline values.

Various manners in which the processor 302 in general, and the engines 206, 210 and the modules 312-326 in particular, may be implemented are discussed in greater detail with respect to the methods 400, 500, and 600 respectively depicted in FIGS. 4-6B. Particularly, FIG. 4 and FIGS. 6A-6B, respectively, depict flow diagrams of example methods 400 and 600 for determining whether a media of a certain length has been detected on a scan panel. FIG. 5 depicts a flow diagram of an example method for calibrating baseline values for use in the methods 400 and 600. It should be apparent to those of ordinary skill in the art that the methods 400, 500, and 600 may represent generalized illustrations and that other operations may be added or existing operations may be removed, modified, or rearranged without departing from the scopes of the methods 400, 500, and 600. Generally speaking, the media engine 114, 206, the calibration engine 210, or the processor 302 depicted in FIGS. 1-3 may implement some or all of the methods 400, 500, and 600.

With reference first to the method 400 depicted in FIG. 4, at block 402, an optical sensor 108, 202 may be operated at a first predetermined level. For instance, the media engine 114, 206 may control the amount of power supplied to the optical sensor 108, 202 to equal the first predetermined level. As another example, the processor 302 may execute the optical sensor module 312 to supply the optical sensor 108, 202 with voltage at the first predetermined level. The first predetermined level may be a first percentage of a full power level at which the optical sensor 108, 202 may be operated. By way of particular example, the first predetermined level may be about ⅜ of the full power level. In any regard, operation of the optical sensor 108, 202 at the first predetermined level may cause a light source, e.g., LED, in the optical sensor 108, 202 to output light at an intensity level corresponding to the first predetermined level.

At block 404, a signal may be received from the optical sensor 108, 202 responsive to the optical sensor 108, 202 being operated at the first predetermined level. For instance, as the optical sensor 108, 202 is operated at the first predetermined level, the optical sensor 108, 202 may detect light and may generate a signal corresponding to the intensity of the detected light. Thus, the intensity of the detected light may be identified from the generated signal. The optical sensor 108, 202 may communicate the generated signal to the media engine 114, 206 (or the processor 302). In other words, the optical sensor 108, 202 may communicate the reading corresponding to the detected light to the media engine 114, 206 (or the processor 302). According to an example, the optical sensor 108, 202 may communicate signals at regular intervals of time, e.g., around 4 times per second, when the lid 106 is in the open position. In addition, the optical sensor 108, 202 may stop sending signals when the lid 106 is in the closed position.

At block 406, a first value corresponding to the received signal may be determined. In a first example, the media engine 114, 206 may determine the first value as being equivalent to the reading of obtained by the optical sensor 108, 202. Likewise, the processor 302 may execute the first value module 314 to determine the first value as being equivalent to the reading obtained by the optical sensor 108, 202. In a second example, the media engine 114, 206 may receive a plurality of readings from the optical sensor 108, 202 and the media engine 114, 206 may compute an average value of the plurality of readings. Likewise, the processor 302 may execute the first value module 314 to receive a plurality of readings from the optical sensor 108, 202 and to compute an average value of the plurality of readings. In this example, the media engine 114, 206 (or the processor 302) may determine the first value as being equivalent to the computed average value. In addition, the plurality of readings may be a predetermined number of readings and may be user-defined. By way of particular examples, the plurality of readings may be around 10 readings or more.

At block 408, a determination may be made as to whether a media 112 has been detected based upon the determined first value. A media 112 having a first document length may be determined as being positioned on the scan panel 104 in response to the determined first value exceeding a first baseline value. For instance, the media engine 114, 206 may determine whether a media 112 having a length sufficient to be detected by the optical sensor 108, 204 has been detected based upon whether determined first value exceeds a first baseline value. As another example, the processor 302 may execute the media detection module 322 to determine whether a media 112 having a length sufficient to be detected by the optical sensor 108, 204 has been detected based upon whether determined first value exceeds a first baseline value. In another example, a determination that such a media 112 has been detected may be made in response to the average value exceeding the first baseline value by a predefined margin. The first baseline value may be determined through a calibration process as discussed in greater detail herein below with respect to FIG. 5.

Reference is now made to FIG. 5. In some examples, the calibration engine 210 may implement the operations of the method 500. In other examples, the processor 302 may execute the calibration module 324 to implement the operations of the method 500. In the following description, a first predetermined level and a second predetermined level may correspond to respective power levels that may be determined prior to implementation of the method 500. For instance, with the lid 106 closed, the drive voltage to the optical sensor 108, 202 may be set to nearly the full scale, for instance about 90% of the full scale. The first predetermined level and the second predetermined level may be determined to be a low percentage and high percentage of that drive voltage. By way of example, the first predetermined level may be determined to be about ⅜ of that drive voltage and the second predetermined level may be determined to be about ¾ of that drive voltage. In addition, the first predetermined level and the second predetermined level may be stored, for instance, in the data store 304.

At block 502, a drive voltage of an optical sensor 108, 202 may be set to the first predetermined level with ambient light to the optical sensor 108, 202 being blocked. That is, the optical sensor 108, 202 may be in a dark or completely dark environment and may output light having an intensity that results from receiving power (or voltage) at the first predetermined level.

At block 504, a first reading of the optical sensor 108, 202 may be determined. That is, as the optical sensor 108, 202 is outputting light at the first intensity, the optical sensor 108, 202 may detect an intensity of the light being reflected back to the optical sensor 108, 202. The optical sensor 108, 202 may also take multiple readings, e.g., 10 or more readings, in which the first reading may be an average value of the multiple readings.

At block 506, the determined first reading may be set as a first baseline value. The first baseline value may be stored in the data store 304. As discussed herein, the first baseline value may be used to determine whether a media 112 has been detected by the optical sensor 108.

At block 508, a drive voltage of the optical sensor 108, 202 may be set to the second predetermined level with ambient light to the optical sensor 108, 202 being blocked. That is, the optical sensor 108, 202 may be in a dark or completely dark environment and may output light having an intensity that results from receiving power (or voltage) at the second predetermined level.

At block 510, a second reading of the optical sensor 108, 202 may be determined. That is, as the optical sensor 108, 202 is outputting light at the second intensity, the optical sensor 108, 202 may detect an intensity of the light being reflected back to the optical sensor 108, 202. The optical sensor 108, 202 may also take multiple readings, e.g., 10 or more readings, in which the second reading may be an average value of the multiple readings.

At block 512, the determined second reading may be set as a first baseline value. The first baseline value may be stored in the data store 304. As discussed herein, the second baseline value may be used to determine whether a media 112 has been detected by the optical sensor 108.

Figure 6A:
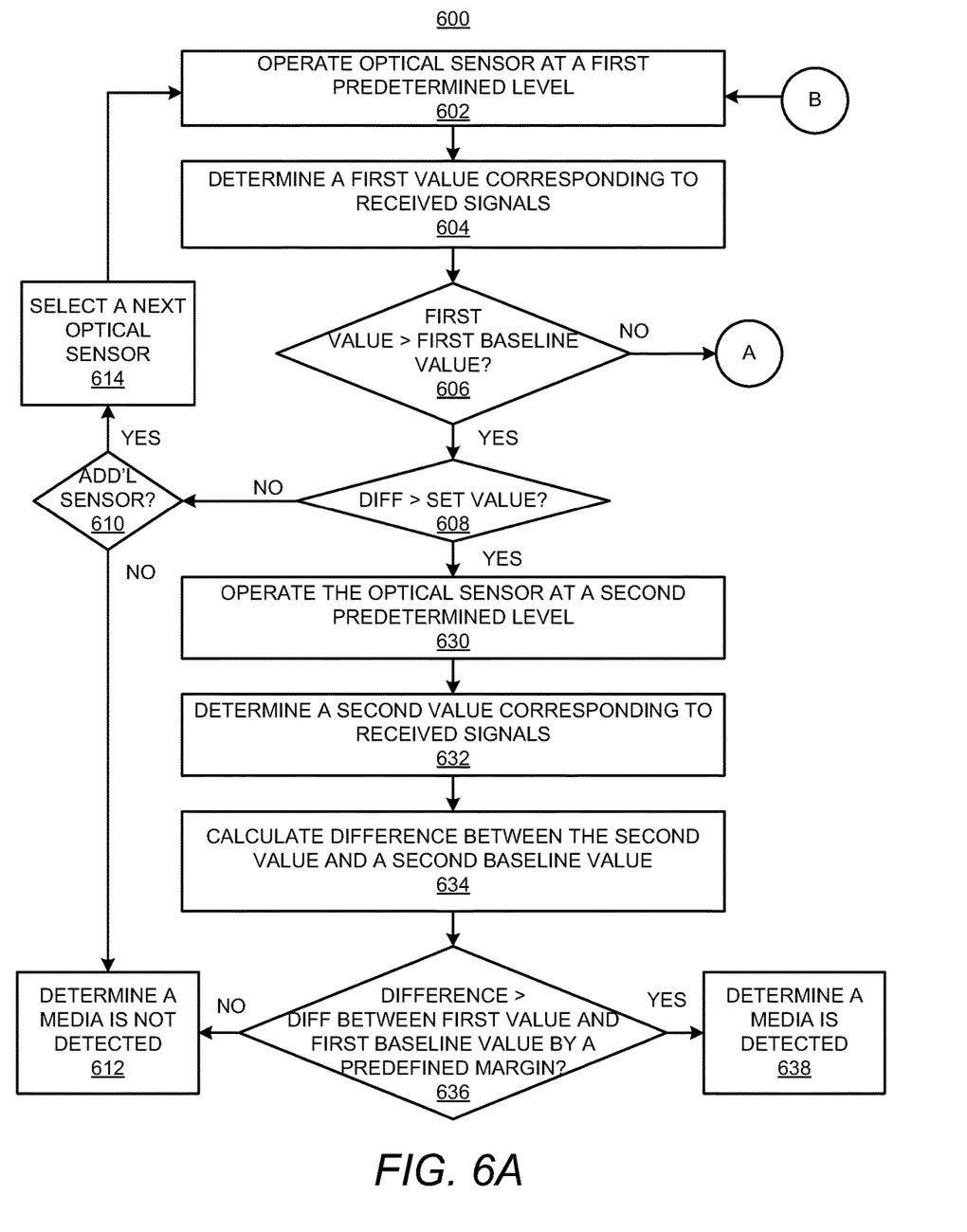
FIGS. 6A and 6B, collectively, depict a flow diagram of an example method for determining whether a media has been detected on a scan panel.
Figure 6B:
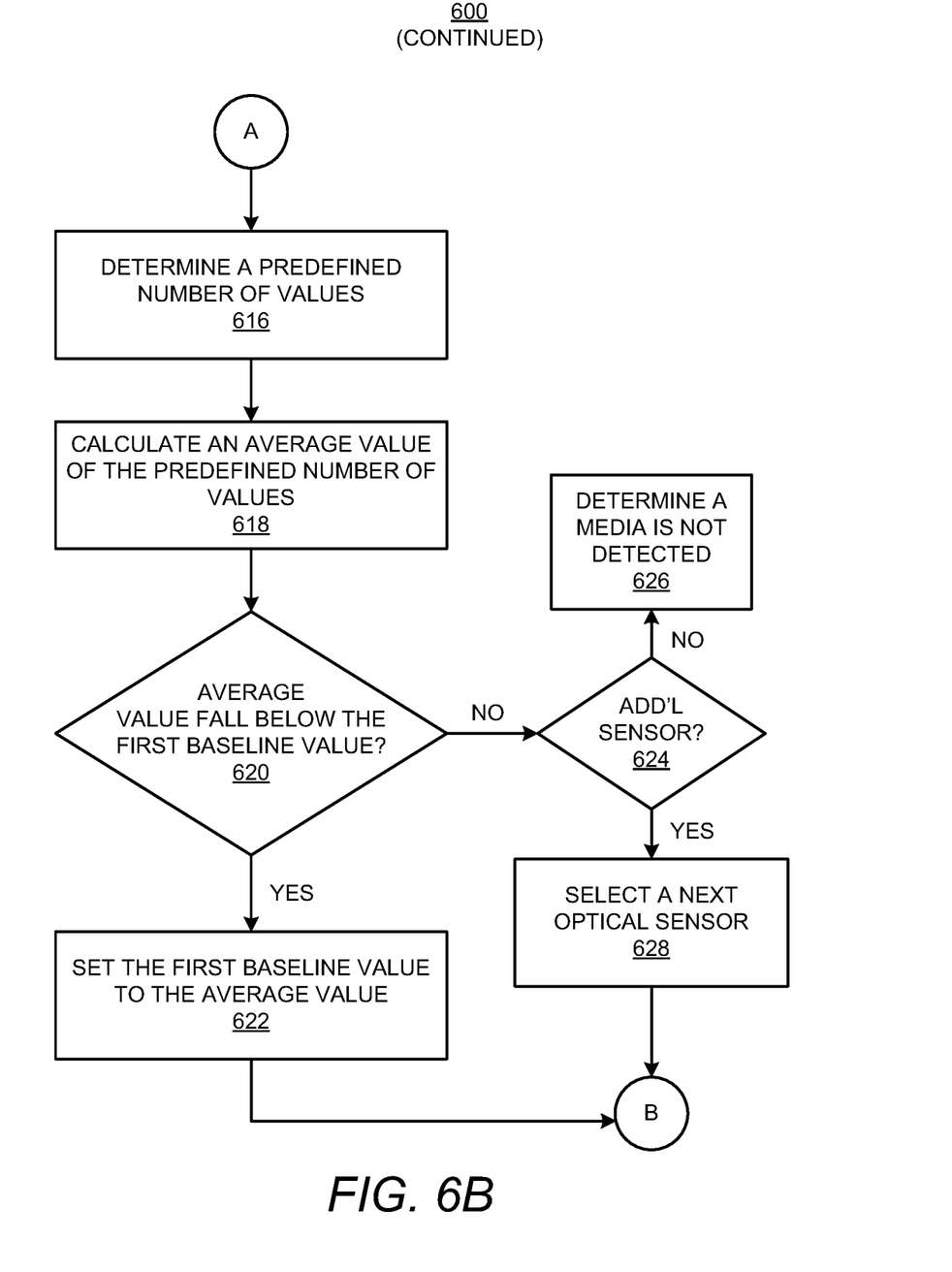

Reference is now made to FIGS. 6A and 6B. In some examples, the media engine 114, 206 may implement the operations of the method 600. In other examples, the processor 302 may execute the modules 312-322 to implement the operations of the method 500.

At block 602, an optical sensor 108, 202 may be operated at a first predetermined level. Block 602 may be similar to block 402 discussed above with respect to FIG. 4.

At block 604, a signal may be received from the optical sensor 108, 202 responsive to the optical sensor 108, 202 being operated at the first predetermined level. Block 604 may be similar to block 404 discussed above with respect to FIG. 4.

At block 606, a determination may be made as to whether the first value exceeds a first baseline value. The first baseline value may correspond to a value that has been determined through a calibration process, such as the calibration process of FIG. 5.

In response to a determination at block 606 that the first value exceeds the first baseline value, at block 608, a determination may be made as to whether the difference exceeds a predefined set value. The predefined set value may be a value that is determined through testing to, for instance, minimize false positives (or false negatives) from being detected. In response to a determination at block 608 that the difference between the first value and the first baseline value does not exceed the predefined set value, a determination may be made as to whether an additional optical sensor is available at block 610. In response to a determination that an additional optical sensor is not available, a determination may be made that a media has not been detected as indicated at block 612. At block 612, a determination may also be made that ambient light has been detected.

However, at block 610, in response to a determination that an additional sensor is available, the next optical sensor may be selected as indicated at block 614. The next optical sensor may be the second optical sensor 204 (FIG. 2), which may be positioned in closer proximity to the origin location 110 (FIG. 1) as discussed above. In one regard, the determination of the difference between the first value and the first baseline value falling below the predefined set value may be construed as an indication that the optical sensor 108, 202 has not detected a media 112. As such, blocks 602-612 may be repeated for the second optical sensor 204 in case a media 112 is on the scan panel 104 but has a shorter length than may be detected by the optical sensor 108, 202. This process may be repeated for additional sensors, if any.

With reference back to block 606, in response to a determination that the first value falls below the first baseline value, a predefined number of values may be determined as indicated at block 616 (FIG. 6B). The predefined number of values may correspond to a plurality of readings by the optical sensor 108, 202 while being operated at the first predetermined level. By way of particular example, the predefined number of values may be from around 25 readings. At block 618, an average value of the predefined number of values may be calculated. In addition, at block 620, a determination is made as to whether the average value falls below the first baseline value. In response to a determination that the average value falls below the first baseline value, the first baseline value may be set to the average value as indicated at block 622. In addition, the method 600 may be performed using the new first baseline value.

With reference back to block 620, in response to the average value exceeding the first baseline value, a determination may be made as to whether an additional optical sensor is available at block 624. In response to a determination that an additional optical sensor is not available, a determination may be made that a media has not been detected as indicated at block 626.

However, at block 624, in response to a determination that an additional sensor is available, the next optical sensor may be selected as indicated at block 628. The next optical sensor may be the second optical sensor 204 (FIG. 2). In addition, blocks 602-628 may be repeated for the second optical sensor 204 in case a media 112 is on the scan panel 104 but has a shorter length than may be detected by the optical sensor 108, 202. This process may be repeated for additional sensors, if any.

With reference back to block 608, in response to a determination that the difference between the first value and the first baseline value exceeding the predefined set value, at block 630, the optical sensor 108, 202 (or additional optical sensor 204 depending upon which of the optical sensors this condition has been determined to be true) may be operated at a second predetermined level. The second predetermined level may be a second percentage of a full power level at which the optical sensor 108, 202 (or second optical sensor 204) may be operated. The second predetermined level may be higher than the first predetermined level. By way of particular example, the second predetermined level may be about ¾ of the full power level. In any regard, operation of the optical sensor 108, 202 (or second optical sensor 204) at the second predetermined level may cause a light source in the optical sensor 108, 202 (or second optical sensor 204) to output light at an intensity level corresponding to the second predetermined level.

At block 632, a signal may be received from the optical sensor 108, 202, 204 responsive to the optical sensor 108, 202, 204 being operated at the second predetermined level and a second value corresponding to the received signals may be determined. For instance, as the optical sensor 108, 202, 204 is operated at the second predetermined level, the optical sensor 108, 202, 204 may detect light and may generate a signal corresponding to an intensity of the detected light. The second value may be determined as being equivalent to the reading obtained by the optical sensor 108, 202, 204 while being operated at the second predetermined level. In other examples the second value may be determined from a computed average of a plurality of readings from the optical sensor 108, 202, 204. By way of particular examples, the plurality of readings may be around 10 readings or more.

At block 634, a difference between the second value and a second baseline value may be determined. In addition, at block 636, a determination may be made as to whether the difference between the second value and the second baseline value exceeds a difference between the first value and the first baseline value by a predefined margin. The predefined margin may be user-defined and/or may be defined based upon testing. By way of particular example, the predefined margin may be about 50%.

In response to a determination that the difference between the second value and the second baseline value exceeds the difference between the first value and the first baseline value by the predefined margin (e.g., about 50%), a determination may be made that a media has been detected by the optical sensor 108, 202, 204 as indicated at block 638. In addition, the length of the detected media may be determined based upon which of the optical sensors 108, 202, 204 detected the media. Moreover, and as also discussed above with respect to FIG. 2, a media having a particular size may be pre-picked from one of the media sources 212a-212n based upon the detected size of the media. By way of example, the processor 302 may execute the media source module 326 to pre-pick the media.

However, in response to a determination that the difference between the second value and the second baseline value does not exceed the difference between the first value and the first baseline value by the predefined margin (e.g., about 50%), a determination may be made that a media has not been detected by the optical sensor 108, 202, 204 as indicated at block 612. In instances in which the scanner apparatus 100 includes multiple optical sensors, a determination may be made at block 612 that none of the multiple optical sensors has detected a media.

Some or all of the operations set forth in the methods 400, 500, and 600 may be contained as utilities, programs, or subprograms, in any desired computer accessible medium. In addition, the methods 400, 500, and 600 may be embodied by computer programs, which may exist in a variety of forms both active and inactive. For example, they may exist as machine readable instructions, including source code, object code, executable code or other formats. Any of the above may be embodied on a non-transitory computer readable medium. Examples of non-transitory computer readable media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A scanner apparatus comprising:
   a housing;
   a scan panel positioned on the housing;
   a lid rotatably mounted to the housing, wherein the lid is to be moved between a closed position and an open position, wherein in the closed position, the lid covers the scan panel and in the open position, the lid is extended away from the scan panel;
   an optical sensor to detect media placed on the scan panel;
   a media engine to determine whether the optical sensor has detected a media on the scan panel while the lid is in the open position; and
a calibration engine to:
   set a drive voltage of the optical sensor to a first predetermined level with ambient light to the optical sensor blocked;
   determine a first reading of the optical sensor at the first predetermined level;
   set the determined first reading as a first baseline value;
   set the drive voltage of the optical sensor to a second predetermined level;
   determine a second reading of the optical sensor at the second predetermined level with ambient light to the sensor blocked; and
   set the determined second reading as a second baseline value.

2. The scanner apparatus according to claim 1, wherein the optical sensor is fixedly positioned at a predetermined distance from an origin location, wherein the predetermined distance corresponds to a predetermined media length.

3. The scanner apparatus according to claim 1, wherein to determine whether the optical sensor has detected a media on the scan panel, the media engine is to:
   operate the optical sensor at a first predetermined level;
   determine a first value corresponding to a signal received from the optical sensor responsive to being operated at the first predetermined level
   determine whether a media has been detected based upon the determined first value.

4. The scanner apparatus according to claim 3, wherein the media engine is further to:
   determine whether the first value exceeds a first baseline value;
   in response to a determination that the first value exceeds the first baseline value, operate the optical sensor at a second predetermined level, wherein the second predetermined level is higher than the first predetermined value;
   calculate a difference between the second value and a second baseline value; and
   in response to a determination that the difference between the second value and the second baseline value exceeds a difference between the first value and the first baseline value by a predefined margin, determine that a media is detected.

5. The scanner apparatus according to claim 4, wherein the first value comprises an average value of a first set of values measured with the optical sensor operated at the first predetermined level and wherein the second value comprises an average value of a second set of values measured with the optical sensor operated at the second predetermined level.

6. The scanner apparatus according to claim 4, wherein the media engine is further to, in response to a determination that the difference between the second value and the second baseline value does not exceed the difference between the first value and the first baseline value by the predefined margin, determine that a media is not detected.

7. The scanner apparatus according to claim 3, wherein the media engine is further to:
   determine whether the first value exceeds a first baseline value;
   in response to a determination that the first value does not exceed the first baseline value, determine a predefined number of values with the optical sensor operated at the first predetermined level;
   calculate an average value of the predefined number of values; and
   in response to a determination that the calculated average value falling below the first baseline value, set the first baseline value to equal the calculated average value.

8. The scanner apparatus according to claim 1, further comprising:
   a second optical sensor positioned to detect media on the scan panel having a shorter length than is detectable by the optical sensor, wherein the media engine is further to determine whether the second optical sensor has detected a media on the scan panel while the lid is in the open position.

9. A method comprising:
   operating, by a processor, an optical sensor at a first predetermined level, wherein the optical sensor is fixedly positioned at a predetermined distance from an origin location on a scan panel, wherein the predetermined distance corresponds to a predetermined media length;
   receiving, by the processor, a signal from the optical sensor responsive to the optical sensor being operated at the first predetermined level;
   determining, by the processor, a first value corresponding to a received signal;
   determining, by the processor, whether a media has been detected as being positioned on the scan panel based upon the determined first value
   determining whether the first value exceeds a first baseline value;
   in response to a determination that the first value exceeds the first baseline value operating the optical sensor at a second predetermined level, wherein the second predetermined level is higher than the first predetermined value.

10. The method according to claim 9, further comprising:
    calculating a difference between the second value and a second baseline value;
    in response to a determination that the difference between the second value and the second baseline value exceeds a difference between the first value and the first baseline value by a predefined margin, determining that a media is detected; and
    in response to a determination that the difference between the second value and the second baseline value does not exceed the difference between the first value and the first baseline value by the predefined margin, determining that the sensor has not detected a media.

11. The method according to claim 10, further comprising:
    setting a drive voltage of the optical sensor to the first predetermined level with ambient light to the optical sensor blocked;
    determining a first reading of the optical sensor at the first predetermined level;
    setting the determined first reading as the first baseline value;

setting the drive voltage of the optical sensor to the second predetermined level;

determining a second reading of the optical sensor at the second predetermined level with ambient light to the optical sensor blocked; and setting the determined second reading as the second baseline value.

12. The method according to claim 9, wherein the optical sensor is positioned beneath the scan glass and a scanner lid is rotatably positioned above the scan glass, wherein operating the optical sensor at the first predetermined level, receiving the signal from the optical sensor, determining the first value, and determining whether a media has been detected as being positioned on the scan glass further comprises operating the optical sensor at the first predetermined level, receiving the signal from the optical sensor, determining the first value, and determining whether a media has been detected as being positioned on the scan glass while the scanner lid is in an open position with respect to the scan glass.

13. A non-transitory computer readable medium on which is stored machine readable instructions that when executed are to cause the processor to:

operate an optical sensor at a first predetermined level, wherein the optical sensor is fixedly positioned at a predetermined distance from an origin location, wherein the predetermined distance corresponds to a predetermined media length;

determine a first value corresponding to a signal received from the optical sensor responsive to the optical sensor being operated at the first predetermined level;

operate the optical sensor at a second predetermined level;

determine a second value corresponding to a signal received from the optical sensor responsive to the optical sensor being operated at the second predetermined level; and determine whether a media has been detected as being positioned on a scan panel based upon comparisons between the first value and a first baseline value and the second value and a second baseline value set a drive voltage of the optical sensor to the first predetermined level with ambient light to the sensor blocked;

determine a first reading of the optical sensor at the first predetermined level; and set the determined first reading as the first baseline value.

14. The non-transitory computer readable medium according to claim 13, wherein the machine readable instructions are further to cause the processor to:

set the drive voltage of the optical sensor to the second predetermined level;

determine a second reading of the optical sensor at the second predetermined level with ambient light to the optical sensor blocked; and set the determined second reading as the second baseline value.

* * * * *